United States Patent
Peak et al.

(10) Patent No.: US 11,105,409 B2
(45) Date of Patent: Aug. 31, 2021

(54) METHOD FOR SETTING PINION GEAR PRELOAD USING ULTRASONIC EQUIPMENT

(71) Applicant: GM GLOBAL TECHNOLOGY OPERATIONS LLC, Detroit, MI (US)

(72) Inventors: Jess Peak, Brighton, MI (US); Thomas J. Koenigbauer, Waterford, MI (US); Carl W. Cadieux, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/525,942

(22) Filed: Jul. 30, 2019

(65) Prior Publication Data
US 2021/0033188 A1   Feb. 4, 2021

(51) Int. Cl.
*F16H 57/023* (2012.01)
*F16H 57/00* (2012.01)
*F16H 48/42* (2012.01)
*G01L 1/00* (2006.01)
*G01B 17/00* (2006.01)
*B60B 33/00* (2006.01)

(52) U.S. Cl.
CPC ....... *F16H 57/023* (2013.01); *B60B 33/0028* (2013.01); *F16H 48/42* (2013.01); *G01B 17/00* (2013.01); *G01L 1/00* (2013.01); *F16H 2057/0062* (2013.01)

(58) Field of Classification Search
CPC .............. F16H 57/023; F16H 48/42; F16H 2057/0062; G01B 17/00; G01L 1/00
See application file for complete search history.

(56) References Cited

U.S. PATENT DOCUMENTS

| | | | | |
|---|---|---|---|---|
| 5,553,927 A | * | 9/1996 | Mastrangelo | B60B 35/18 301/105.1 |
| 6,736,544 B1 | * | 5/2004 | DeWald | F16C 19/56 29/898.09 |
| 2005/0223804 A1 | * | 10/2005 | Nakamura | G01L 5/246 73/581 |
| 2006/0094558 A1 | * | 5/2006 | Petruska | F16H 57/037 475/220 |
| 2015/0167813 A1 | * | 6/2015 | Downs | B60K 17/165 475/230 |

* cited by examiner

*Primary Examiner* — Lawrence Averick
(74) *Attorney, Agent, or Firm* — Cantor Colburn LLP

(57) ABSTRACT

A method for assembling an axle assembly for a vehicle including that a pinion gear is inserted into a differential housing. The pinion gear having a first end and a second end opposite the first end. The pinion gear further includes a gear head at the first end, external threads proximate the second end, and external splines located a first distance away from the second end. The method further includes that a flange is slid over the second end of the pinion gear. The flange including internal splines. The method also includes that the internal splines of the flange are engaged with the external splines of the pinion gear and the flange is anchored to prevent the flange and the pinion gear from rotating. The method may further include that ultrasonic sound waves are transmitted through the pinion gear and reflections of the ultrasonic sound waves are detected.

7 Claims, 8 Drawing Sheets

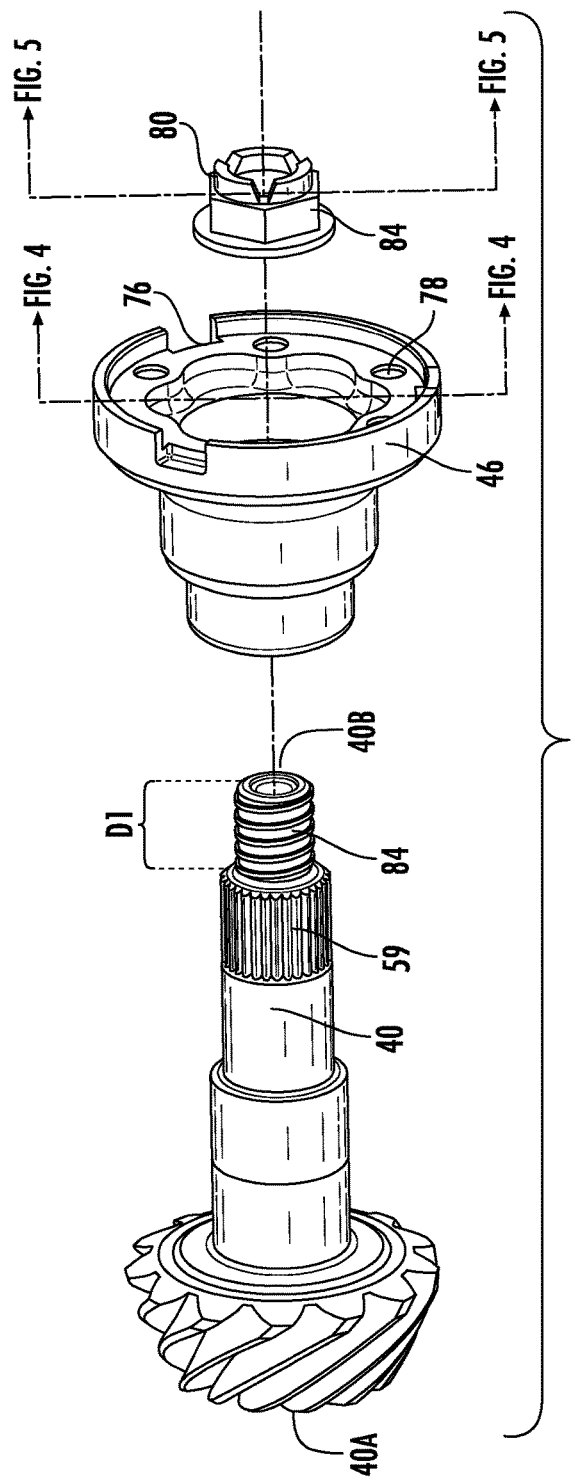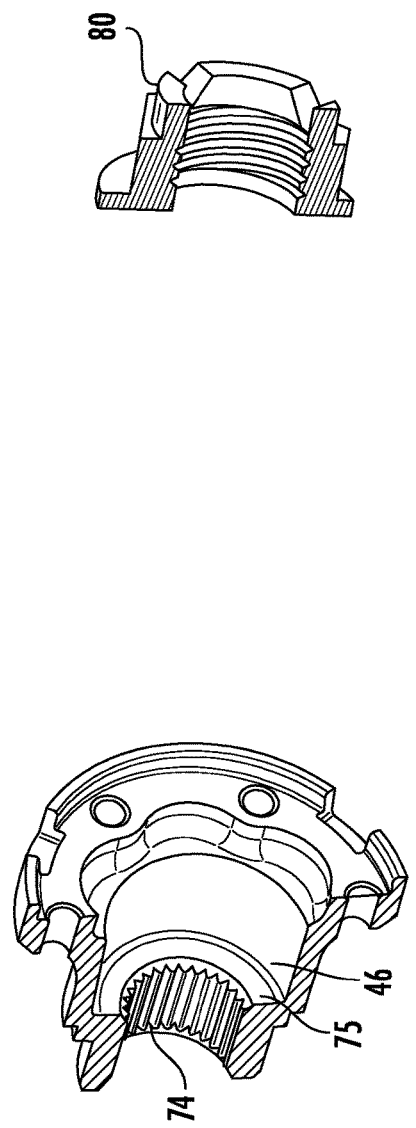

METHOD FOR SETTING PINION GEAR PRELOAD USING ULTRASONIC EQUIPMENT

INTRODUCTION

The subject disclosure relates to a vehicle differential assembly, and more particularly relates to methods and systems for installing a pinion gear within a vehicle differential pinion assembly.

Vehicles, such as automobiles and trucks for example, include a differential and axle assembly, sometimes colloquially referred to as a drive module. This assembly is connected to the vehicle transmission or transfer case by a prop-shaft. The prop-shaft transmits rotational energy (torque) developed by the vehicle engine to the differential and axle assembly, which in turn transmits the rotational energy to the wheels. In a rear wheel drive vehicle, the prop-shaft directly couples the differential and axle assembly to the vehicle's transmission. In an all-wheel or four-wheel drive vehicle, additional components may also be included, such as a power take-off unit for example.

SUMMARY

In one exemplary embodiment, a method for assembling an axle assembly for a vehicle is provided. The method including that a pinion gear is inserted into a differential housing. The pinion gear having a first end and a second end opposite the first end. The pinion gear further includes a gear head at the first end, external threads proximate the second end, and external splines located a first distance away from the second end. The method further includes that a flange is slid over the second end of the pinion gear. The flange including internal splines. The method also includes that the internal splines of the flange are engaged with the external splines of the pinion gear and the flange is anchored to prevent the flange and the pinion gear from rotating. The method may further include that ultrasonic sound waves are transmitted through the pinion gear and reflections of the ultrasonic sound waves are detected. The method may yet further include that a pinion nut is threaded onto the external threads of the pinion gear. The pinion nut including internal threads configured to thread onto the external threads of the pinion gear. The method may additionally include that a preload of the pinion nut on the pinion gear is determined in response to the reflections of the ultrasonic sound waves.

In addition to one or more of the features described herein, or as an alternative, further embodiments may include that the flange is interlocked with an outer stationary locking fixture.

In addition to one or more of the features described herein, or as an alternative, further embodiments may include that a boss of the outer stationary locking fixture is inserted into an orifice of the flange to interlock the flange with the outer stationary locking fixture.

In addition to one or more of the features described herein, or as an alternative, further embodiments may include that a key of the outer stationary locking fixture is inserted into a keyway of the flange to interlock the flange with the outer stationary locking fixture.

In addition to one or more of the features described herein, or as an alternative, further embodiments may include that the pinion nut is rotated onto the external threads of the pinion gear using an inner rotating fixture.

In addition to one or more of the features described herein, or as an alternative, further embodiments may include that the pinion nut is rotated onto the external threads of the pinion gear using an inner rotating fixture. The inner rotating fixture being configured to fit within a central passageway of the outer stationary locking fixture.

In addition to one or more of the features described herein, or as an alternative, further embodiments may include that an ultrasonic transducer is moved proximate to the first end of the pinion gear using a lower fixture, the ultrasonic transducer configured being to transmit the ultrasonic soundwaves into the pinion gear and detect the reflections of the ultrasonic soundwaves.

In addition to one or more of the features described herein, or as an alternative, further embodiments may include that the ultrasonic transducer is moved proximate to the first end of the pinion gear using a lower fixture until a support structure of the lower fixture abuts the first end of the pinion gear.

In addition to one or more of the features described herein, or as an alternative, further embodiments may include that a length of the pinion gear is determined in response to the reflections of the ultrasonic sound waves; determining a force reading on the pinion gear in response to the length; and determining the preload of the pinion nut on the pinion gear in response to the force reading.

In addition to one or more of the features described herein, or as an alternative, further embodiments may include that an alert is activated when the preload is equivalent to a desired preload.

In another exemplary embodiment, a pinion gear installation fixture assembly for assembling an axle assembly for a vehicle is provided. The pinion gear installation fixture assembly including an upper fixture assembly configured to thread a pinion nut onto a pinion gear and hold the pinion gear stationary. The pinion gear having a first end and a second end opposite the first end. The pinion gear further includes a gear head at the first end, external threads proximate the second end, and external splines located a first distance away from the second end. The pinion gear installation fixture assembly also including an ultrasonic transducer configured to transmit ultrasonic soundwaves into the pinion gear and detect reflections of the ultrasonic soundwaves.

In addition to one or more of the features described herein, or as an alternative, further embodiments may include a controller configured to determine a preload of the pinion nut on the pinion gear in response to the reflections of the ultrasonic sound waves.

In addition to one or more of the features described herein, or as an alternative, further embodiments may include that the upper fixture assembly further includes: an outer stationary locking fixture configured to interlock with a flange, the flange comprising internal splines configured to engage with the external splines of the pinion gear.

In addition to one or more of the features described herein, or as an alternative, further embodiments may include that the outer stationary locking fixture further includes: a lower surface and a boss extending away from the lower surface of the outer stationary locking fixture. The boss being configured to interlock with an orifice of the flange.

In addition to one or more of the features described herein, or as an alternative, further embodiments may include that the outer stationary locking fixture further includes: an outer face and a key extending radially outward away from the outer face of the outer stationary locking fixture. The key being configured to interlock with a keyway of the flange.

In addition to one or more of the features described herein, or as an alternative, further embodiments may include a lower fixture configured to move the ultrasonic transducer proximate to the first end of the pinion gear, the ultrasonic transducer being attached to the lower fixture.

In addition to one or more of the features described herein, or as an alternative, further embodiments may include that the lower fixture further includes: an upper surface; and a support structure extending away from the upper surface of the lower fixture. The support structure configured to abut the first end of the pinion gear to ensure proper placement of the ultrasonic transducer relative to the pinion gear.

In addition to one or more of the features described herein, or as an alternative, further embodiments may include that the upper fixture assembly further includes an inner rotating fixture configured to rotate the pinion nut onto the external threads of the pinion gear.

In addition to one or more of the features described herein, or as an alternative, further embodiments may include that the upper fixture assembly further includes: an inner rotating fixture configured to rotate the pinion nut onto the external threads of the pinion gear. The inner rotating fixture being configured to fit within a central passageway of the outer stationary locking fixture.

In addition to one or more of the features described herein, or as an alternative, further embodiments may include that the inner rotating fixture further includes a nut locking recess configured to engage with a locking outer surface of the pinion nut.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 3 is an exploded view of a pinion, a flange, and a pinion nut of the differential of FIG. 2, according to an embodiment of the present disclosure;

FIG. 4 is a cutaway view of the flange of FIG. 3, according to an embodiment of the present disclosure;

FIG. 5 is a cutaway view of the pinion nut of FIG. 3, according to an embodiment of the present disclosure;

DETAILED DESCRIPTION

Figure 1:
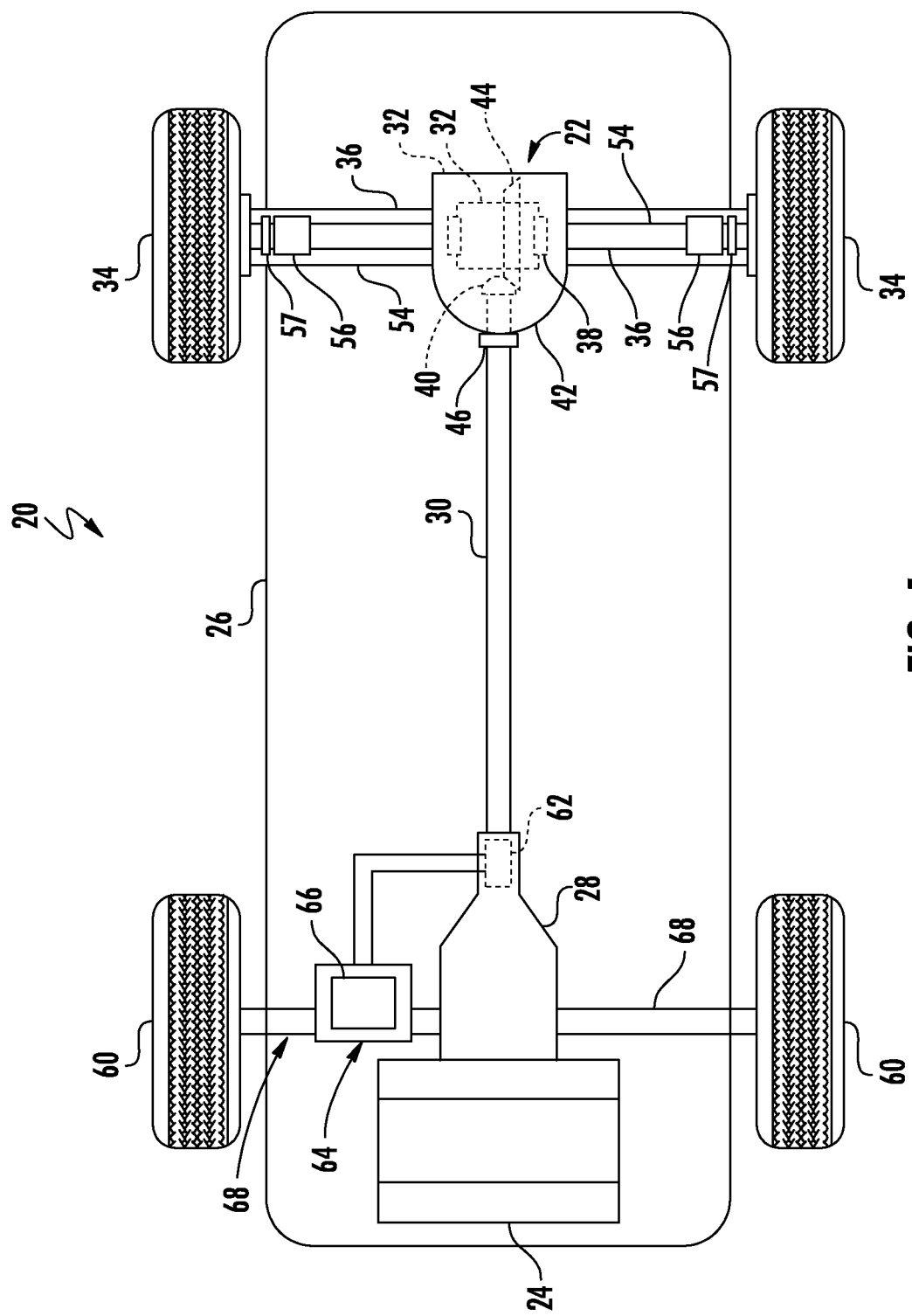
FIG. 1 is a top schematic view of a vehicle having a differential, according to an embodiment of the present disclosure.

The following description is merely exemplary in nature and is not intended to limit the present disclosure, its application or uses. It should be understood that throughout the drawings, corresponding reference numerals indicate like or corresponding parts and features.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in various embodiments.

Vehicles, such as automobiles and trucks for example, include a differential and axle assembly, sometime colloquially referred to as a drive module. This assembly is connected to the vehicle transmission or transfer case by a prop-shaft. The prop-shaft transmits rotational energy (torque) developed by the vehicle engine to the differential and axle assembly, which in turn transmits the rotational energy to the wheels. In a rear-wheel drive vehicle, the prop-shaft directly couples the differential and axle assembly to the vehicle's transmission. In an all-wheel or four-wheel drive vehicle, additional components may also be included, such as a power take-off unit for example.

The axle includes a pinion gear to transfer rotational energy from the prop-shaft to the axle assembly. During assembly of the axle, rolling torque is typically used to set the pinion gear preload in the assembly. This process of using differential rolling torque is labor intensive as it involves taking bearing rolling torque data, calculating an assembly rolling torque, and using that data to determine a preload vs rolling torque. During assembly of the axle, the assembly equipment typically rotates the pinion gear while also torqueing a pinion nut onto the pinion gear until a desired preload is achieved.

Embodiments disclosed herein seek to provide methods and systems for an ultrasonic transducer to aid in assembling the axle. An ultrasonic transducer would be placed proximate the end of the pinion gear while the pinion nut is torqued. Torque will be applied to the pinion nut until the desired preload is achieved, as detected by the ultrasonic transducer. Advantageously, by eliminating the use of a rolling torque calculation and a direct measurement of the load on the pinion is obtained using the ultrasonic transducer, which removes variations that may have been caused by minor bearing differences, rust preventative amount/type, environmental and handling variations.

Referring now to FIG. 1, a vehicle 20 having an axle assembly 22 is illustrated according to an embodiment of the present disclosure. The axle assembly 22 may sometimes be referred to as a rear drive module. It should be appreciated that the vehicle 20 may be an automobile, truck, van or sport utility vehicle for example. As used herein, the term vehicle is not limited to just an automobile, truck, van or sport utility vehicle, but may also include any self-propelled or towed conveyance suitable for transporting a burden. The vehicle 20 may include an engine 24, such as an electric motor or an internal combustion engine for example. The engine 24 may further be a hybrid type engine that combines an internal combustion engine with an electric motor for example. The engine 24 and axle assembly 22 are coupled to a frame or other chassis structure 26. The engine 24 may be coupled to the axle assembly 22 by a transmission 28 and a driveshaft 30. The transmission 28 may not be required if the engine 24 is an electric motor. The transmission 28 may be configured to reduce the rotational velocity and increase the torque of the engine output. This modified output (i.e., reduced rotational velocity) is then transmitted to the axle assembly 22 via the driveshaft 30. The axle assembly 22 transmits the output torque from the driveshaft 30 through a differential gear set 32 to a pair of driven-wheels 34 via axles 36.

The differential gear set 32 is arranged within a differential housing 42. The differential gear set 32 receives the output from the driveshaft 30 via a pinion gear 40 that transmits the torque to a ring gear 44. The pinion gear 40 includes a shaft that is coupled to the driveshaft 30 by a flange 46. The differential gear set 32 is supported for rotation within the differential housing 42 by a pair of differential bearings (see FIG. 2). The differential gear set 32 includes side gears 38 arranged within the differential housing 42 that are coupled to and support one end of the axles 36. The coupling of rotational components, such as the flange 46 to the pinion gear 40 or the side gears 38 to the axle shafts 36 for example, may be accomplished using a spline connection.

In one embodiment, each axle shaft 36 extends into an axle tube 54. The axle tube 54 includes a hollow interior that extends the length thereof. At one end of the axle tube 54 a bearing 56 is mounted to support the end of the axle 36 adjacent the driven-wheel 34. A shaft seal 57 is located between the bearing 56 and the driven-wheel 34. The driven-wheel 34 is coupled to the axle shaft 36 adjacent to bearing 56 and seal 57. The axle shaft 36 provides an interface for mounting of the driven-wheel 34.

The vehicle 20 further includes a second set of wheels 60 arranged adjacent the engine 24. In one embodiment, the second set of wheels 60 is also configured to receive output from the engine 24. This is sometimes referred to as a four-wheel or an all-wheel drive configuration. In this embodiment, the vehicle 20 may include a transfer case 62 that divides the output from the transmission 28 between the front and rear driven wheels 34, 60. The transfer case 62 transmits a portion of the output to a front differential assembly 64, which may include additional components such as a differential gear set 66 and axles 68 that transmit the output to the wheels 60.

Figure 2:
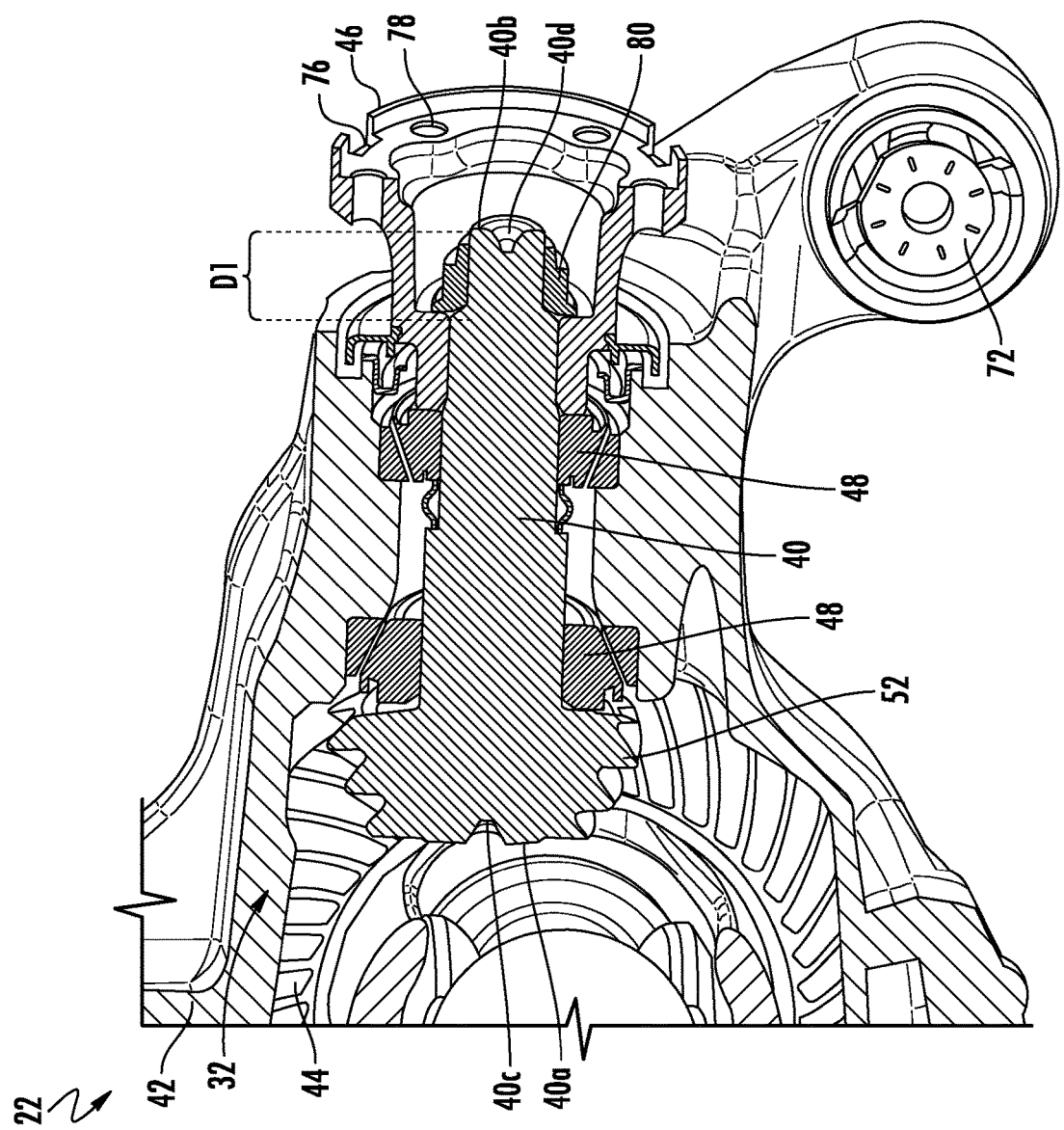
FIG. 2 is a cutaway view of the differential of FIG. 1, according to an embodiment of the present disclosure.

Referring now to FIG. 2, with continued reference to FIG. 1, a cutaway view of the axle assembly 22 is illustrated. The differential gear set 32 is arranged within the differential housing 42. The differential housing 42 is mounted to the vehicle frame or chassis structure in one or more locations such as by the bushing mount 72 for example. The differential gear set 32 includes the pinion gear 40 and the ring gear 44. The pinion gear 40 is supported for rotation within the differential housing 42 by a pair of bearings 48. The pinion gear 40 includes a first end 40a and a second end 40b opposite the first end 40a. The first end 40a may also be referred to as the forward end and the second end 40b may also be referred to as the aft end. The first end 40a may include a first orifice 40c extending from the first end 40a into the pinion gear 40. The second end 40b may include a second orifice 40d extending from the second end 40b into the pinion gear 40. The pinion gear 40 includes a gear head 52 at the first end 40a that engages with the ring gear 44. The pinion gear 40 includes external splines 59 located proximate the second end 40b and at a first distance D1 away from the second end 40b, as illustrated in FIG. 3. The flange 46 includes internal splines 74 and a nut seat 75, as illustrated in FIG. 4. The external splines 59 of the pinion gear 40 engage with internal splines 74 of the flange 46. The flange 46 includes orifices 78, which allow the flange 46 to be securely fastened to the driveshaft 30 (see FIG. 1) via one or more fastening mechanisms, such as, for example, bolts and nuts. The driveshaft 30 (see FIG. 1) transmits torque to the flange 46 through the orifices 78 located in the flange 46. The flange 46 transfers torque to the pinion gear 40 through the engagement (i.e., splined connection) of the internal splines 74 of the flange 46 with the external splines 59 of the pinion gear 40.

A pinion nut 80 securely fastens to the pinion gear 40 proximate the first end 40b. The pinion nut 80 secures the flange 46 to the pinion gear 40. The pinion nut 80 abuts the nut seat 75 of the flange 46, thus securing the flange 46 to the pinion gear 40. The pinion nut 80 may secure to the pinion gear 40 via a threaded connection. The pinion nut 80 includes internal threads 82 and the pinion gear 40 includes external threads 84, as illustrated in FIGS. 3 and 5. The external threads 84 of the pinion gear 40 are located proximate the second end 40b of the pinion gear 40. The internal threads 82 of the pinion nut 80 are configured to thread onto the external threads 84 of the pinion gear 40. In an embodiment, the pinion nut 80 is a hex nut that includes a locking outer surface 84. The locking outer surface 84 may be hexagonal in shape.

Referring now to FIGS. 6, 7, 8, and 9, with continued reference to FIGS. 1-5, a pinion gear installation fixture assembly 100 is illustrated, according to an embodiment of the present disclosure. The pinion gear installation fixture assembly 100 is used aid in the installation of the pinion nut 80 onto the pinion gear 40 by ensuring that a correct preload is being applied by the pinion nut 80 onto the pinion gear 40 using an ultrasonic transducer 110.

The pinion gear installation fixture assembly 100 includes an ultrasonic transducer 110, a lower fixture 120, and an upper fixture assembly 150. The upper fixture assembly 150 includes an inner rotating fixture 160, and an outer stationary locking fixture 170. The inner rotating fixture 160 being configured to rotate and thread the pinion nut 80 onto the external threads 84 of the pinion gear 40. The outer stationary locking fixture 170 is configured to engage or interlock with the flange 46 to hold the flange 46 stationary (i.e., preventing the flange from rotating) as the inner rotating fixture 160 rotates the pinion nut 80 onto the external thread 84 of the pinion gear 40. By holding the flange 46 stationary, the pinion gear 40 is also held stationary (i.e., prevented from rotating) by the engagement (i.e., splined connection) of the internal splines 74 of the flange 46 with the external splines 59 of the pinion gear 40. The outer stationary locking fixture 170 may be configured to engage or interlock with the flange 46 through one or more interlocking features including a boss 172 and/or a key 176.

Figure 7:
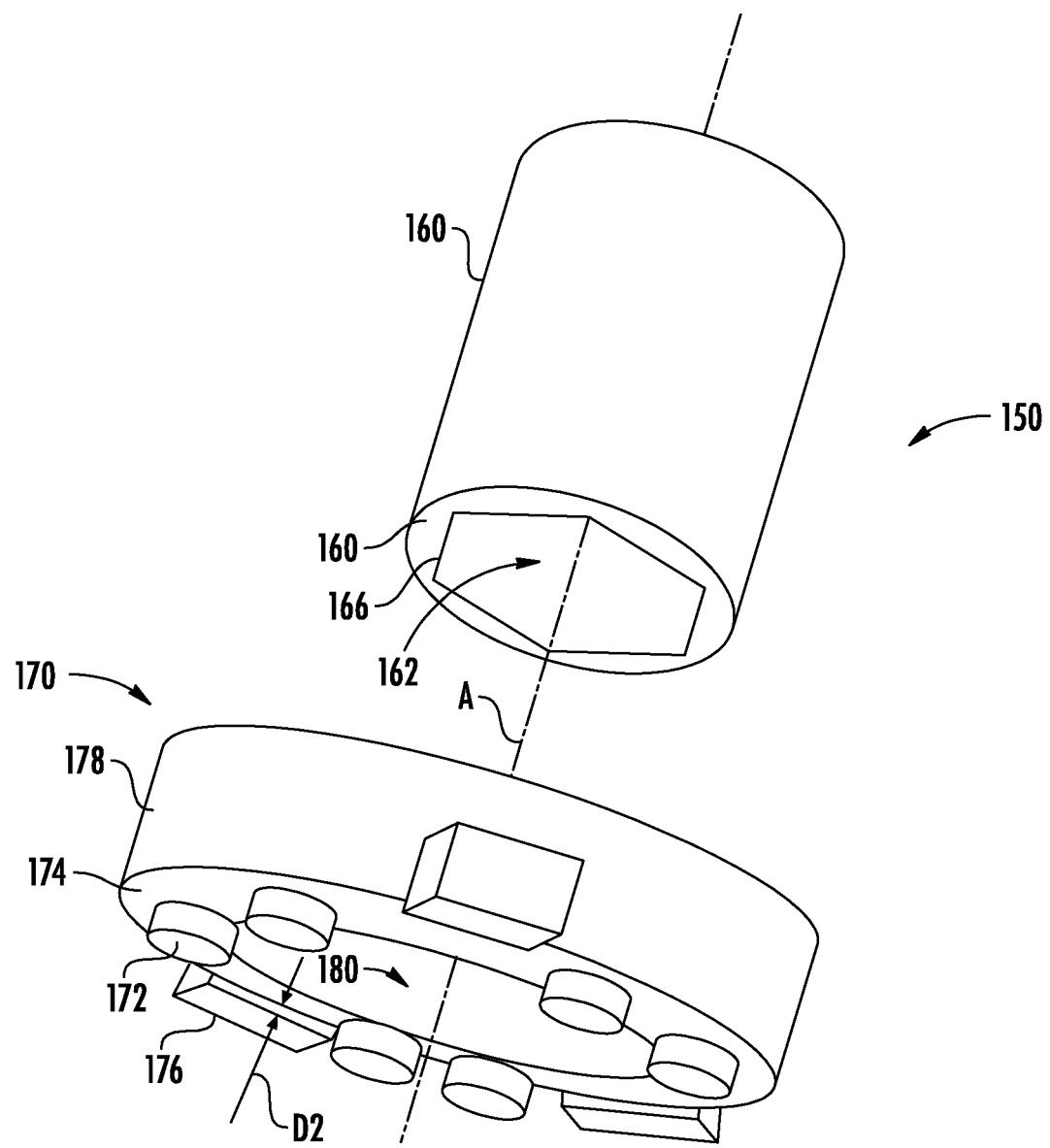
FIG. 7 is an isometric view of an upper fixture assembly of the pinion gear installation fixture assembly of FIG. 6, according to an embodiment of the present disclosure.
Figure 8:
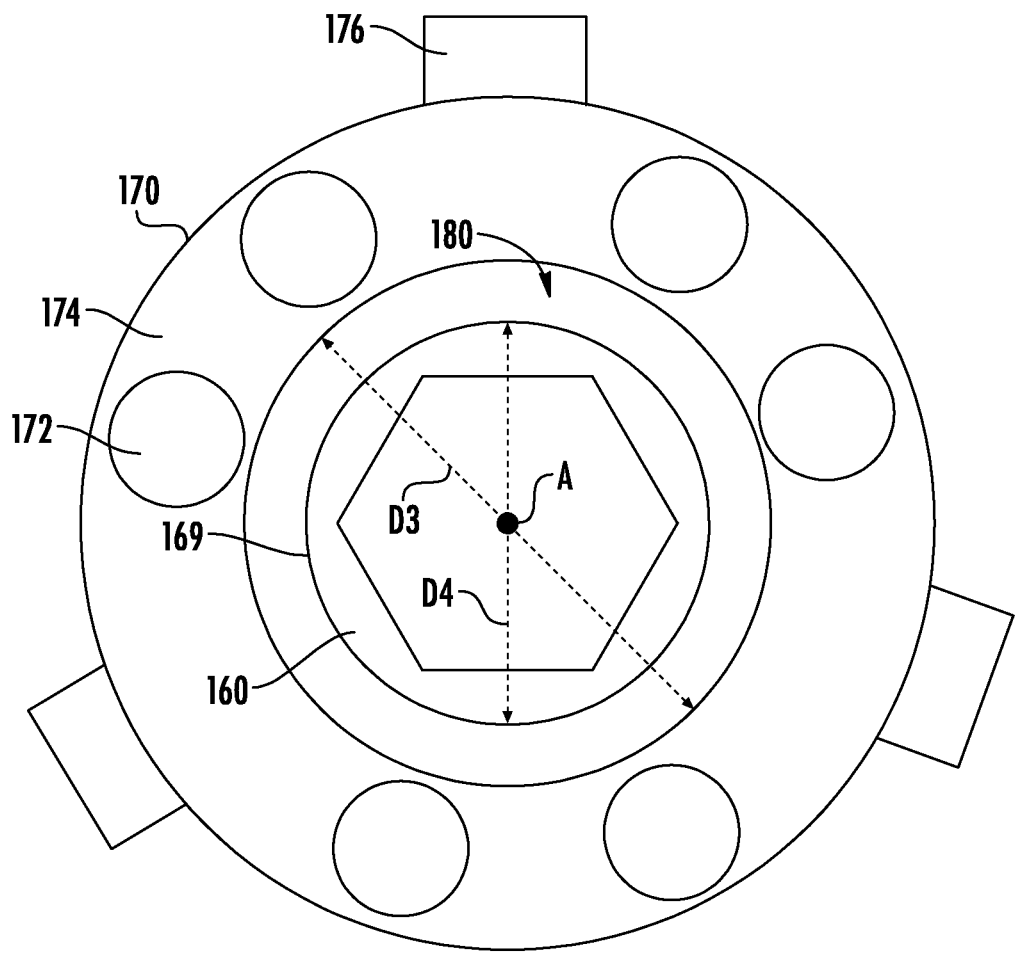
FIG. 8 is an axial cross-sectional view of the upper fixture assembly of the pinion gear installation fixture assembly of FIG. 6, according to an embodiment of the present disclosure.

The outer stationary locking fixture 170 may include zero or any number of bosses 172. In an embodiment, the outer stationary locking fixture 170 includes six bosses 172, as shown in FIGS. 7 and 8. The boss 172 extends away from a lower face 174 of the outer stationary locking fixture 170 and is configured to extend into the orifice 78 of the flange 46. The boss 172 of the outer stationary locking fixture 170 is configured to interlock or engage with the orifice 78 of the flange 46.

Figure 6:
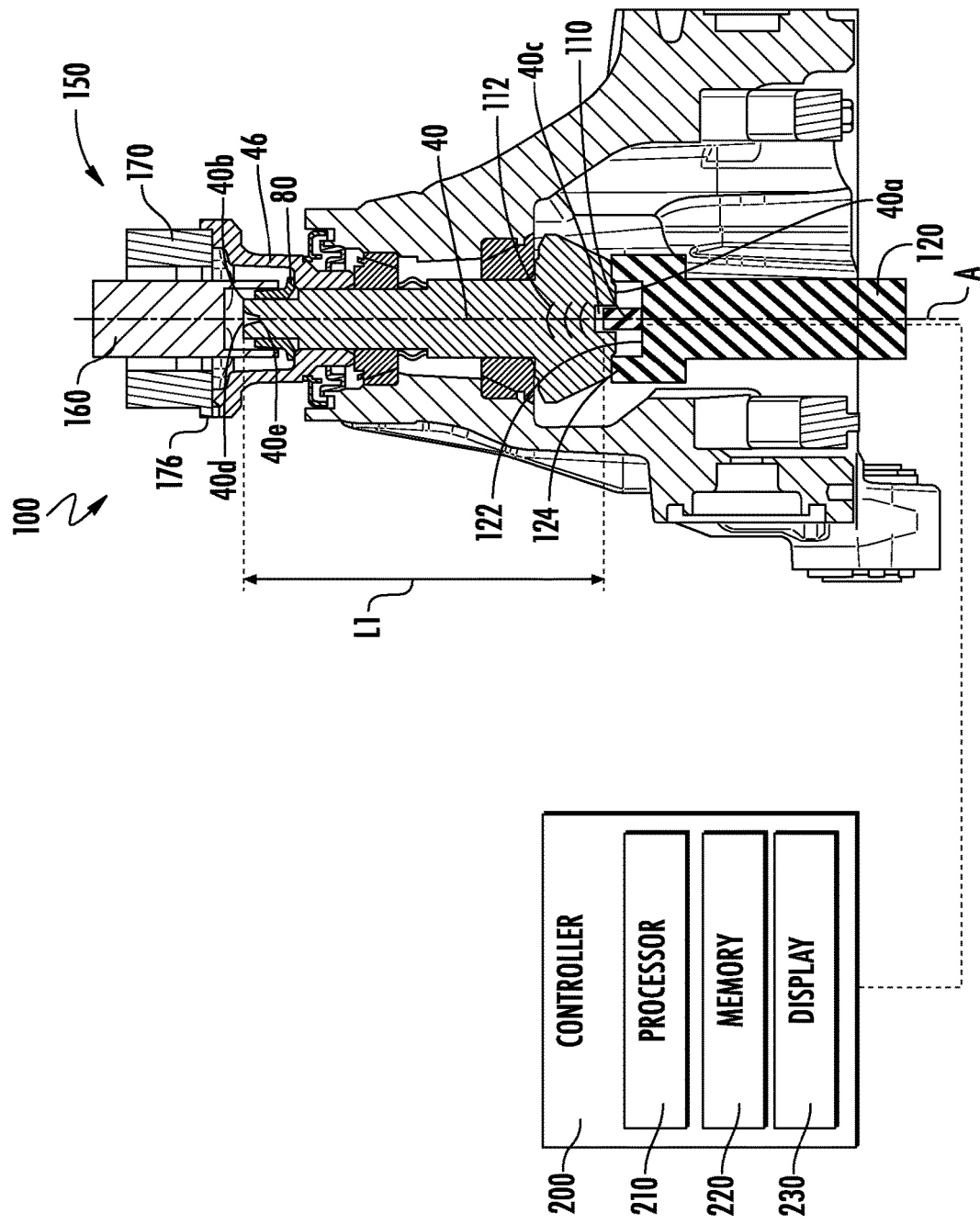
FIG. 6 is a cross-sectional view of a pinion gear installation fixture assembly for assembling the differential of FIG. 2, according to an embodiment of the present disclosure.

The outer stationary locking fixture 170 may include zero or any number of keys 176. In an embodiment, the outer stationary locking fixture 170 includes three keys 176, as shown in FIGS. 7 and 8. The keys 176 extend radially outward (i.e., away from a central axis A) from an outer face 178 of the outer stationary locking fixture 170. The outer outward face 178 may be circular in shape, as illustrated in FIGS. 7 and 8. The key 176 may also be offset away from the lower face 174 by a second distance D2. The key 176 is configured to extend into the keyway 76 of the flange 46 and interlock with the keyway 76 of the flange 46. The outer stationary locking fixture 170 also includes a central passageway 180 configured. As illustrated in FIGS. 6 and 8, the inner rotating fixture 160 is configured to fit within the central passageway 180, such that the inner rotating fixture 160 may rotate the pinion nut 80 while the outer stationary locking fixture 170 holds the flange 46 stationary. An inner diameter D3 of the central passageway 180 is greater than an outer diameter D4 of an outer surface 169 of the inner rotating fixture 160, as illustrated in FIG. 8.

Figure 9:
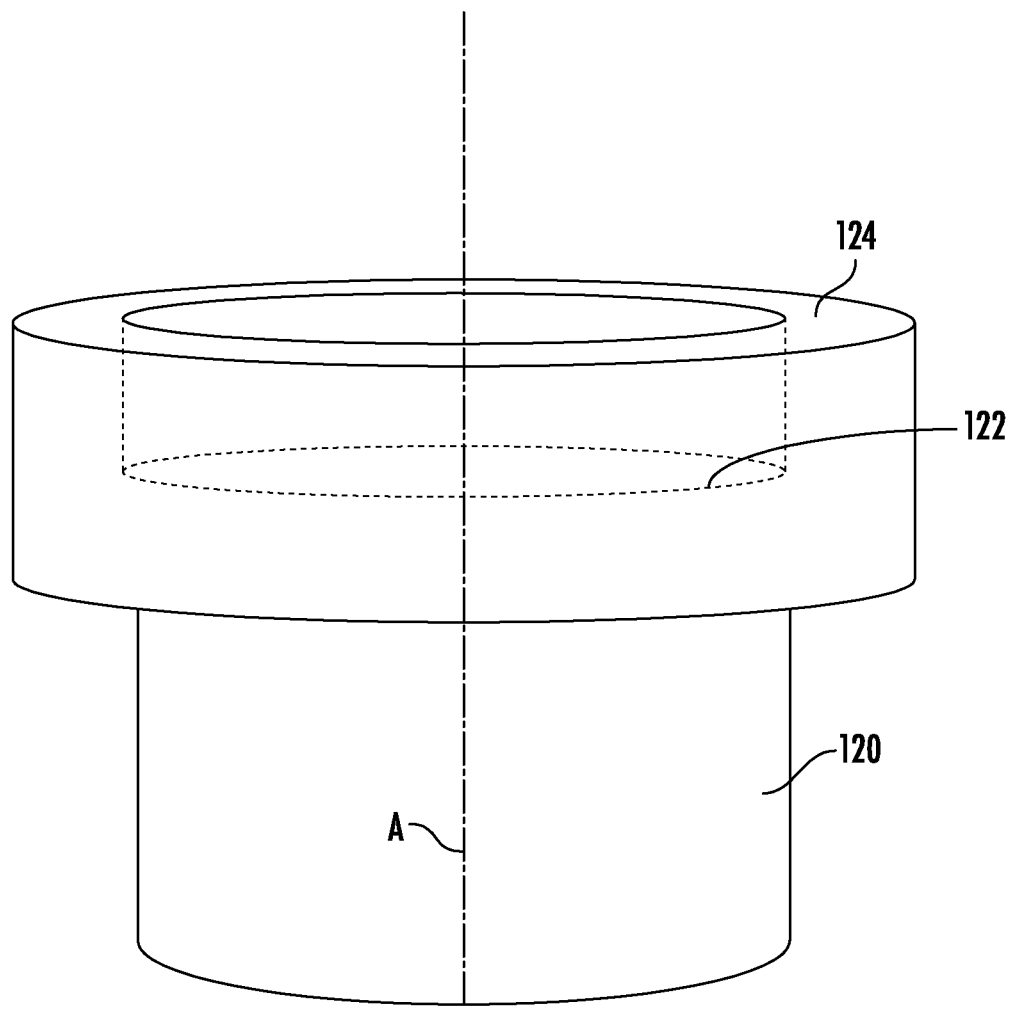
FIG. 9 is an isometric view of a lower fixture of the pinion gear installation fixture assembly of FIG. 6, according to an embodiment of the present disclosure.

The inner rotating fixture 160 includes a nut locking recess 162 that initiates at an opening 166 on the lower face 164 of the inner rotating fixture 160 and extends into the inner rotating fixture 160, as illustrated in FIG. 9. The nut locking recess 162 is configured to engage with the locking outer surface 84 of the pinion nut 80. The nut locking recess 162 may be hexagonal in shape.

The lower fixture 120 is configured to provide support to the first end 40a of the pinion gear 40 during installation of the pinion nut 80 onto the pinion gear 40. More specifically, the lower fixture 120 may hold the pinion gear 40 up (i.e., against the downward pull of gravity) while the pinion nut 80 is being tightened onto the pinion gear 40 by the upper fixture assembly 150.

The ultrasonic transducer 110 may be attached to the lower fixture 120, which may move the ultrasonic transducer 110 proximate to the first end 40a and/or within the first orifice 40c. The ultrasonic transducer 110 may be attached to an upper surface 122 of the lower fixture 120. The lower fixture 120 may include a support structure 124 extending away from the upper surface 122 of the lower fixture 120. The support structure 124 may be a complete ring as illustrated in FIG. 9 or the support structure 124 may be one or more protruding structures extending away from the upper surface 122 of the lower fixture 120. The support structure 124 is configured to abut (i.e., touch) the first end 40a of the pinion gear 40 to ensure proper placement of the ultrasonic transducer 110 relative to the pinion gear 40. Advantageously, the support structure 124 ensures a measurably consistent and repeatable placement of the ultrasonic transducer 110 relative to the pinion gear 40. In other words, the support structure 124 serves as a go-no gauge (i.e., go/no-go) for placement of the ultrasonic transducer 110. The ultrasonic transducer 110 may be inserted in the first orifice 40c, as illustrated in FIG. 6. In alternative embodiments (not shown), the ultrasonic transducer 110 may be attached to the inner rotating fixture 160, which may move the ultrasonic transducer 110 proximate the second end 40b and/or within the second orifice 40d.

The ultrasonic transducer 110 is configured to transmit ultrasonic sound waves 112 into the pinion gear 40 and detect reflections of the ultrasonic sound waves 112. The ultrasonic sound waves 112 may be used to determine a length L1 of the pinion gear 40 along the central axis A from the ultrasonic transducer 110 to the second end 40b of the pinion gear 40. The length L1 may be determined by detecting a time that the ultrasonic sound waves 112 take to be transmitted from the ultrasonic transducer 110, reflected off the second end 40b or the second orifice 40d, and arrive back at the ultrasonic transducer 110. In an embodiment, the second orifice 40d may include a flat base 40e to ensure proper reflection of the ultrasonic sound waves 112. As the pinion nut 80 is being tightened onto external threads 84 proximate the second end 40b of the pinion gear 40, the pinion gear 40 may extend in length L1. This tension in length L1 may be then be converted to a force reading to determine the preload that the pinion nut 80 is applying to the pinion gear 40. The pinion nut 80 may then be tightened or loosened to achieve a desired preload.

The ultrasonic transducer 110 may be in electronic communication with a controller 200. The controller 200 may be an electronic controller including a processor 210 and an associated memory 220 comprising computer-executable instructions that, when executed by the processor, cause the processor to perform various operations. The processor 210 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 220 may be but is not limited to a random access memory (RAM), read only memory (ROM), or other electronic, optical, magnetic or any other computer readable medium.

The controller 200 may analyze readings obtained the by the ultrasonic transducer 110. The controller 200 may include a display 230 to display the readings and other data such as for example, the length L1, the force, or the preload. The display 230 may be a digital or analogue display.

Figure 10:
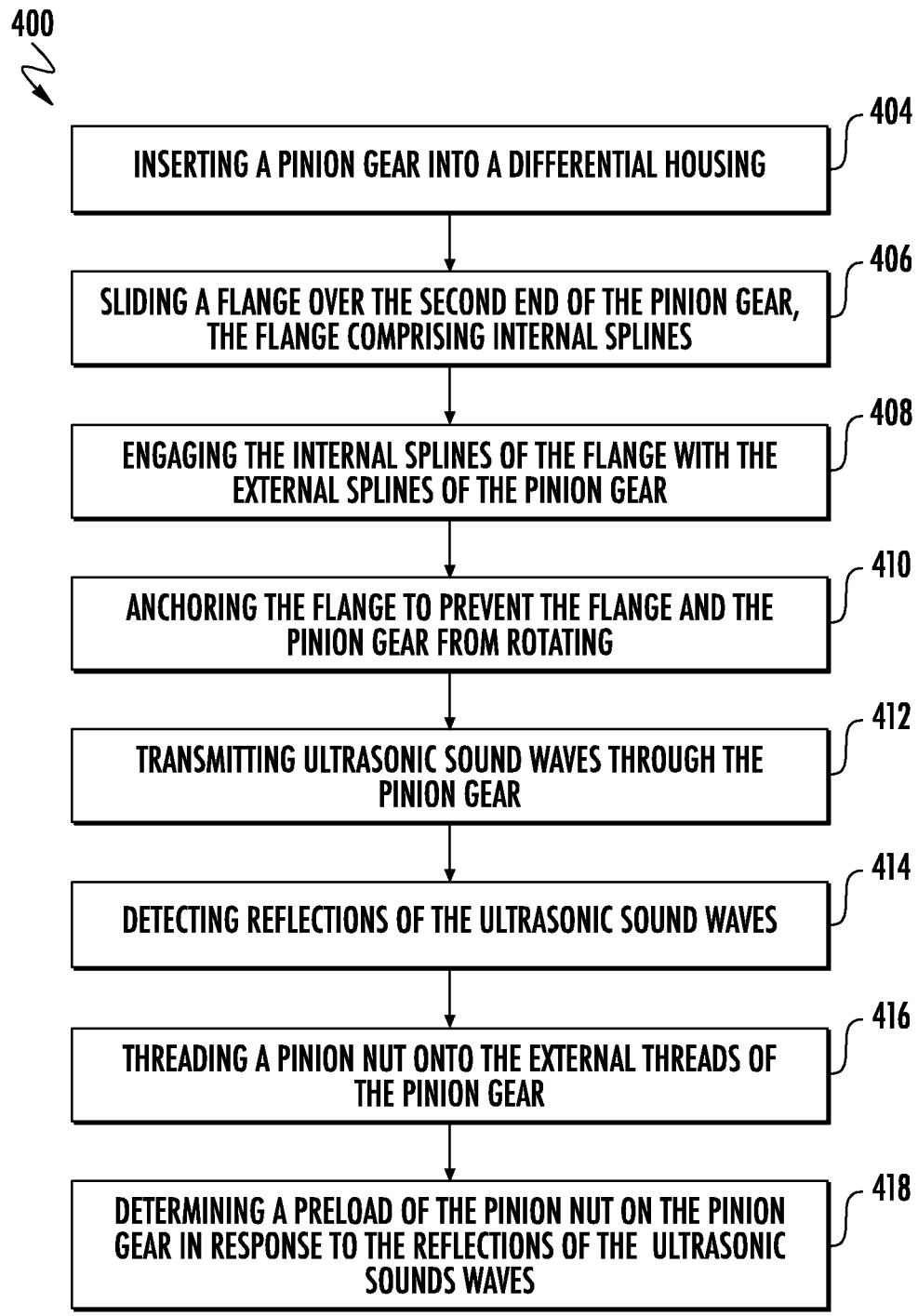
FIG. 10 is a flow diagram illustrating a method of assembling the differential of FIG. 2, according to an embodiment of the present disclosure.

Referring to FIG. 10, with continued reference to FIGS. 1-9, a method 400 for assembling an axle assembly 22 for a vehicle 20 is illustrated, in accordance with an embodiment of the present disclosure. At block 404, a pinion gear 40 is inserted into a differential housing 42. The pinion gear 40 having a first end 40a and a second end 40b opposite the first end 40a. The pinion gear 40 further comprises a gear head 52 proximate the first end 40a, external threads 84 proximate the second end 40b, and external splines 59 located a first distance D1 away from the second end 40b.

At block 406, a flange 46 is slid over the second end 40b of the pinion gear 40. The flange 46 comprising internal splines 74. At block 408, the internal splines 74 of the flange 46 engage with the external splines 59 of the pinion gear 40. At block 410, the flange 46 is anchored (i.e., secured) to prevent the flange 46 and the pinion gear 40 from rotating. The flange 46 may be anchored by interlocking the flange 46 with an outer stationary locking fixture 170. The flange 46 may be interlocked with the outer stationary locking fixture 170 by inserting a boss 172 of the outer stationary locking fixture 170 into an orifice 78 of the flange 46. The flange 46 also may be interlocked with the outer stationary locking fixture 170 by inserting a key 176 of the outer stationary locking fixture 170 into a keyway 76 of the flange 46.

At block 412, ultrasonic sound waves 112 are transmitted through the pinion gear 40. At block 414, reflections of the ultrasonic sound waves 112 are detected. At block 416, a pinion nut 80 is threaded onto the external threads 84 of the pinion gear 40. The pinion nut 80 comprises internal threads 82 configured to thread onto the external threads 84 of the pinion gear 40. The pinion nut 80 may be threaded by rotating the pinion nut 80 onto the external threads 84 of the pinion gear 40 using an inner rotating fixture 160. The inner rotating fixture 160 is configured to fit within a central passageway 180 of the outer stationary locking fixture 170.

At block 418, a preload of the pinion nut 80 on the pinion gear 40 is determined in response to the reflections of the ultrasonic sound waves 112. The preload of the pinion nut 80 on the pinion gear 40 may be determined by determining a length L1 of the pinion gear 40 in response to the reflections of the ultrasonic sound waves 112, determining a force reading on the pinion gear 40 in response to the length L1, and determining the preload of the pinion nut 80 on the pinion gear 40 in response to the force reading. An alert may be activated when the preload is equivalent to a desired preload.

The method 400 may further comprise that the ultrasonic transducer 110 is moved proximate to the first end 40a of the pinion gear 40 using a lower fixture 120. The ultrasonic transducer 110 may be moved proximate to the first end 40a of the pinion gear 40 using a lower fixture 120 until a support structure 124 of the lower fixture 120 abuts the first end 40a of the pinion gear 40.

While the above description has described the flow process of FIG. 10 in a particular order, it should be appreciated that unless otherwise specifically required in the attached claims that the ordering of the steps may be varied.

As described above, embodiments can be m the form of processor-implemented processes and devices for practicing those processes, such as processor. Embodiments can also be in the form of computer program code (e.g., computer program product) containing instructions embodied in tangible media, such as floppy diskettes, CD ROMs, hard drives, or any other non-transitory computer readable medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an device for practicing the exemplary embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method for assembling an axle assembly for a vehicle, the method comprising:
   inserting a pinion gear into a differential housing, the pinion gear having a first end and a second end opposite the first end, wherein the pinion gear further comprises a gear head at the first end, external threads proximate the second end, and external splines located a first distance away from the second end;
   sliding a flange over the second end of the pinion gear, the flange comprising internal splines;
   engaging the internal splines of the flange with the external splines of the pinion gear;
   anchoring the flange to prevent the flange and the pinion gear from rotating, wherein the flange is anchored by;
   interlocking the flange with an outer stationary locking fixture, the outer stationary locking fixture having a central passageway;
   transmitting ultrasonic sound waves through the pinion gear;
   detecting reflections of the ultrasonic sound waves;
   inserting an inner rotating fixture within the central passageway of the outer stationary locking fixture;
   rotating a pinion nut onto the external threads of the pinion gear using the inner rotating fixture while the outer stationary locking feature holds the flange stationary and while the inner rotating fixture is located within the central passageway, the pinion nut comprising internal threads configured to thread onto the external threads of the pinion gear; and
   determining a preload of the pinion nut on the pinion gear in response to the reflections of the ultrasonic sound waves.

2. The method of claim 1, further comprising:
inserting a boss of the outer stationary locking fixture into an orifice of the flange to interlock the flange with the outer stationary locking fixture.

3. The method of claim 1, further comprising:
inserting a key of the outer stationary locking fixture into a keyway of the flange to interlock the flange with the outer stationary locking fixture.

4. The method of claim 1, further comprising:
moving an ultrasonic transducer proximate to the first end of the pinion gear using a lower fixture,
the ultrasonic transducer being configured to transmit the ultrasonic soundwaves into the pinion gear and detect the reflections of the ultrasonic soundwaves.

5. The method of claim 4, further comprising:
moving the ultrasonic transducer proximate to the first end of the pinion gear using the lower fixture until a support structure of the lower fixture abuts the first end of the pinion gear.

6. The method of claim 4, further comprising:
determining a length of the pinion gear in response to the reflections of the ultrasonic sound waves;
determining a force reading on the pinion gear in response to the length; and
determining the preload of the pinion nut on the pinion gear in response to the force reading.

7. The method of claim 1, further comprising:
activating an alert when the preload is equivalent to a desired preload.

\* \* \* \* \*